(12) United States Patent
Yen

(10) Patent No.: US 10,882,505 B1
(45) Date of Patent: Jan. 5, 2021

(54) BRAKE CABLE WITH LUBRICANT SEALING DEVICE

(71) Applicant: Chih-Yang Yen, Taichung (TW)

(72) Inventor: Chih-Yang Yen, Taichung (TW)

( * ) Notice: Subject to any disclaimer, the term of this patent is extended or adjusted under 35 U.S.C. 154(b) by 0 days.

(21) Appl. No.: 16/559,719

(22) Filed: Sep. 4, 2019

(51) Int. Cl.
*B60T 17/04* (2006.01)
*F16C 1/24* (2006.01)
*F16C 1/18* (2006.01)

(52) U.S. Cl.
CPC .............. *B60T 17/043* (2013.01); *F16C 1/18* (2013.01); *F16C 1/24* (2013.01)

(58) Field of Classification Search
CPC ............. B60T 17/043; F16C 1/18; F16C 1/24
See application file for complete search history.

(56) References Cited

U.S. PATENT DOCUMENTS

| | | | | |
|---|---|---|---|---|
| 4,302,036 A | * | 11/1981 | Burge .................. | F16L 37/0925 285/104 |
| 4,871,196 A | * | 10/1989 | Kingsford ............. | F16L 19/083 285/123.1 |
| 2005/0121909 A1 | * | 6/2005 | Densel .................. | B25B 27/023 285/322 |

FOREIGN PATENT DOCUMENTS

| | | | | |
|---|---|---|---|---|
| EP | 2246078 A1 | * | 11/2010 | ................ F16C 1/06 |
| WO | WO-2017064028 A1 | * | 4/2017 | ............ F16L 19/028 |

\* cited by examiner

*Primary Examiner* — Melanie Torres Williams
(74) *Attorney, Agent, or Firm* — Alan D. Kamrath; Karin L. Williams; Mayer & Williams PC

(57) ABSTRACT

A brake cable includes joining member including a hollow body having external threads, an externally extended rim at an end, and a channel through the body; a fastening member including an internal space having internal threads, a hollow extension extending out of a first end, a tunnel through the extension to communicate with the space, and an annular surface on a first end of the space adjacent to the extension; a sealing assembly urged against the annular surface; a cable assembly including a flexible sleeve having an outer annular flange; and an oil tube having a first end secured to the extension. The cable assembly is through the oil tube. Both the joining member and the fastening member are configured to compress the sealing assembly so as to urge the sealing assembly against the annular surface for preventing lubricant from leaking.

6 Claims, 6 Drawing Sheets

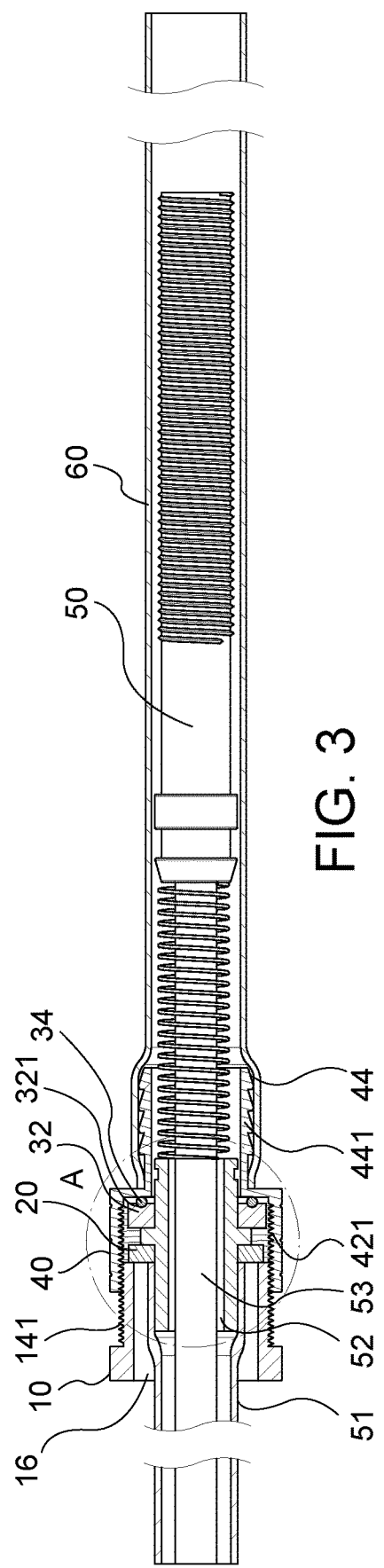
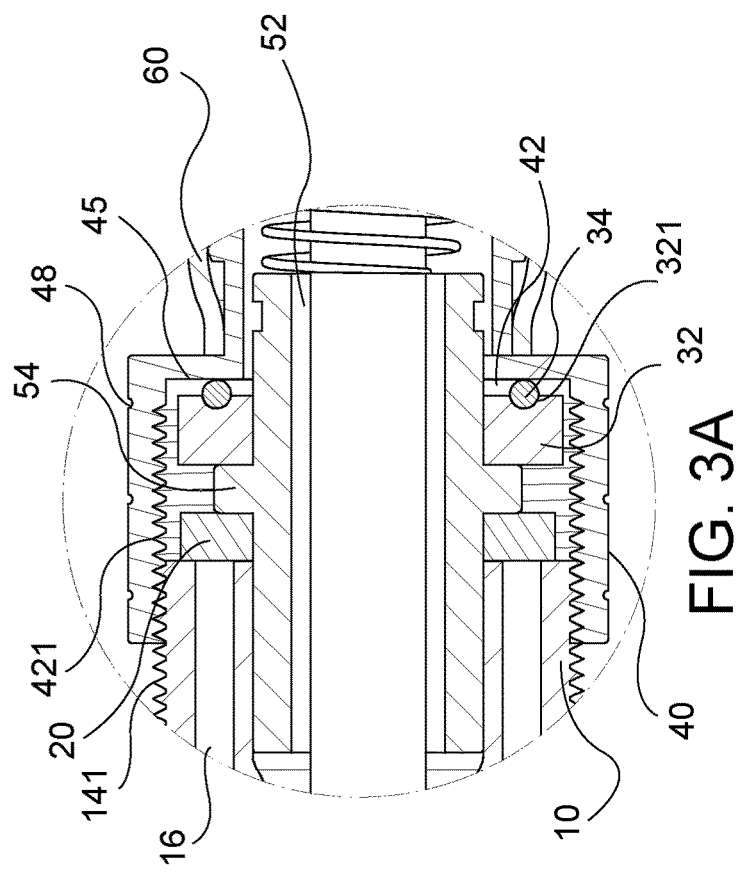

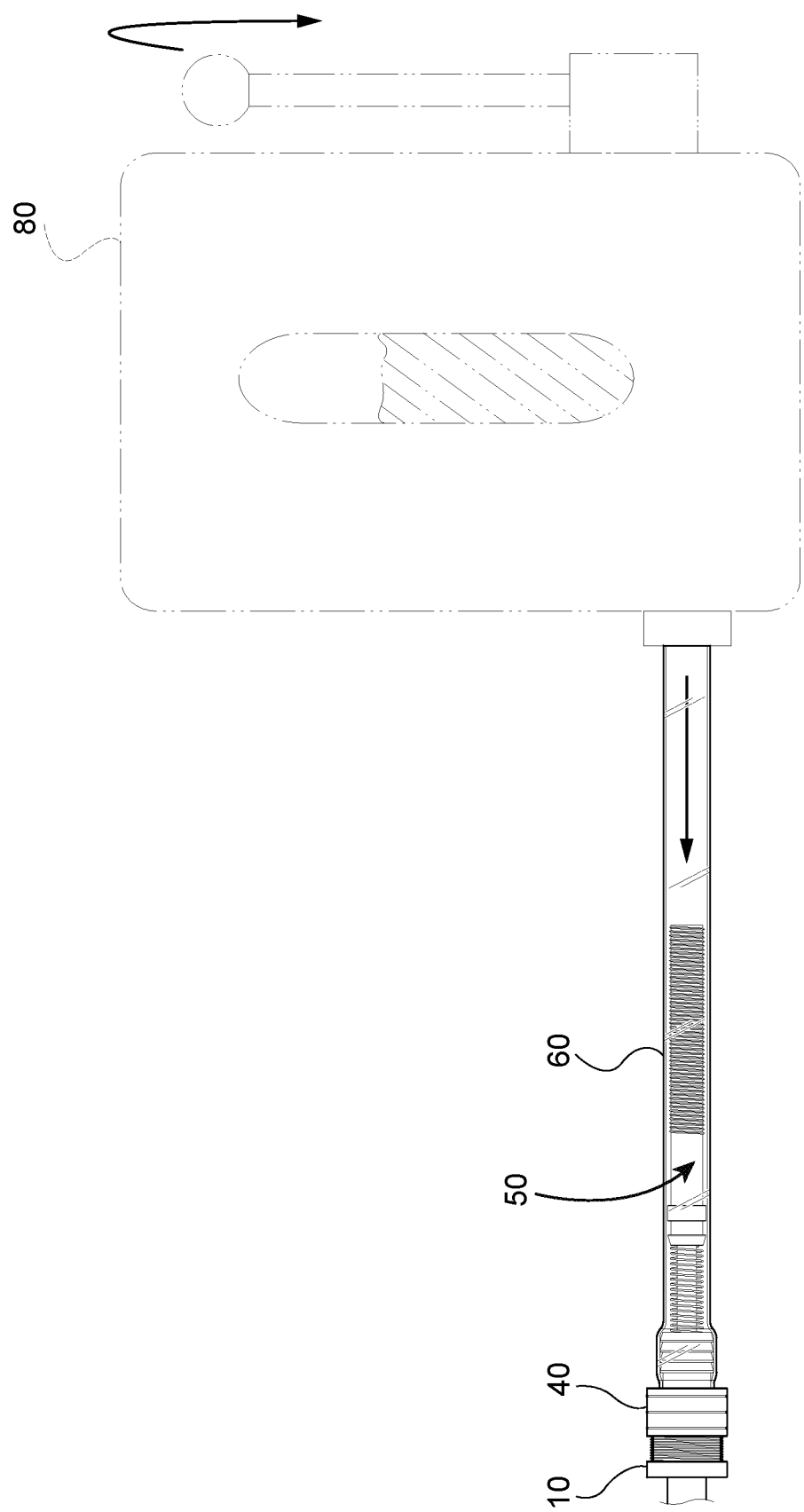

BRAKE CABLE WITH LUBRICANT SEALING DEVICE

BACKGROUND OF THE INVENTION

1. Field of the Invention

The invention relates to brake cables and more particularly to a vehicle (e.g., bicycle, motorcycle, or automobile) brake cable having a lubricant sealing device with improved characteristics.

2. Description of Related Art

Conventionally, a vehicle (e.g., bicycle, motorcycle, or automobile) is equipped with one or more brake cables in its braking system. For maintaining the braking system, it is typical of removing the braking system out of the vehicle and pouring lubricant into a brake cable through an opening. The lubricant may diffuse through the brake cable. Thus, the purpose of maintaining the braking system is achieved.

However, the lubricant as brake fluid has a high viscosity. Thus, the lubricant poured into the brake cable through the opening may flow very slowly through a gap between an inner cable and a plastic housing. It is often that it may take several hours to soak the inner cable with the lubricant.

Thus, the need for improvement still exists.

SUMMARY OF THE INVENTION

It is therefore one object of the invention to provide a brake cable, comprising a joining member including a hollow body having external threads on an outer surface, an externally extended rim at a first end of the hollow body, and a channel through the hollow body; a fastening member including an internal space having internal threads, a hollow extension extending out of a first end, a tunnel through the hollow extension to communicate with the internal space, and an annular surface on a first end of the internal space adjacent to the hollow extension; a sealing assembly urged against the annular surface; a cable assembly including a flexible sleeve with the joining member, the sealing assembly, and the fastening member are sequentially put thereon, an annular flange disposed on an outer surface of the flexible sleeve, and a C-clip disposed at a second end of the hollow body and compressed by and between the hollow body and the annular flange wherein an inner diameter of the C-clip is less than an outer diameter of the annular flange and an outer diameter of the C-clip is greater than a diameter of the channel; and an oil tube having a first end secured to the hollow extension; wherein the cable assembly is disposed through the oil tube from the first end of the oil tube; wherein the external threads and the internal threads are threadedly secured together so that both the joining member and the fastening member are configured to compress the sealing assembly so as to urge the sealing assembly against the annular surface for preventing lubricant from leaking; and wherein the flexible sleeve includes an inner cable passing through, a gap formed between the inner cable and an inner surface of the flexible sleeve, and an opening disposed at a first end of the flexible sleeve so that the lubricant is configured to fill into the gap between the inner cable and the flexible sleeve through the opening.

The invention has the following advantages and benefits in comparison with the conventional art: The cable assembly and the oil tube are fastened together by means of simple fastening member and related elements. Further, the manual oil pump can pump the lubricant into the gap between the inner surface of the flexible sleeve and the inner cable, thereby quickly soaking the inner cable. Thus, the inner cable can be sufficiently maintained. Purposes of preventing the inner cable from being rusted and worn are obtained.

The above and other objects, features and advantages of the invention will become apparent from the following detailed description taken with the accompanying drawings.

BRIEF DESCRIPTION OF THE DRAWINGS

FIG. 3 is a longitudinal sectional view of FIG. 1;

FIG. 3A is a detailed view of the area in circle A of FIG. 3;

FIG. 6 schematically depicts pumping cable assembly from a manual oil pump into the brake cable through the oil tube.

DETAILED DESCRIPTION OF THE INVENTION

Figure 1:
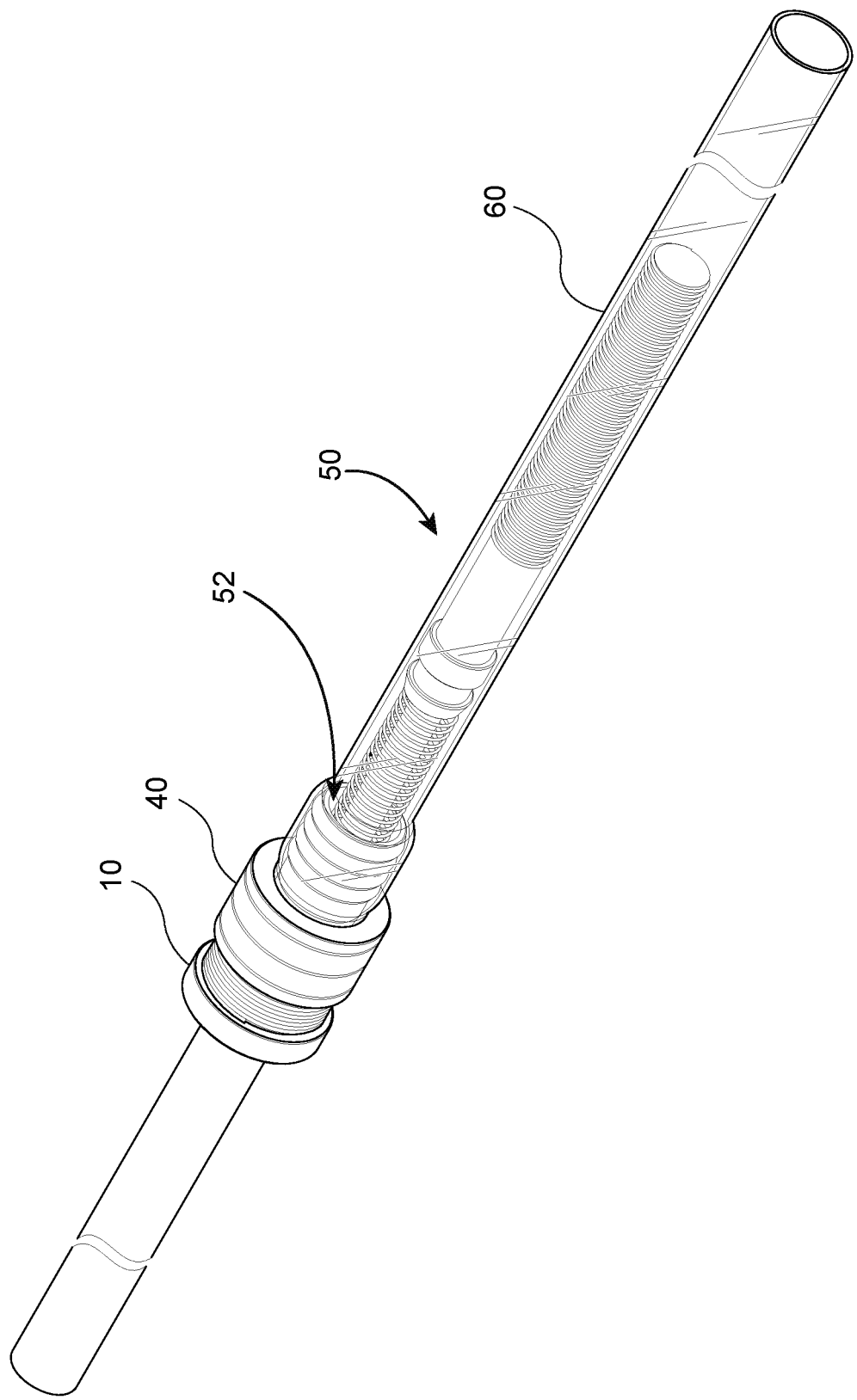
FIG. 1 is a perspective view of a brake cable according to the invention.

Referring to FIGS. 1 to 3A, a brake cable in accordance with the invention comprises a joining member 10, a sealing assembly 30, and a fastening member 40 as described in detail below.

The joining member 10 includes a hollow, cylindrical body 14 having external threads 141 on an outer surface, an externally extended rim 12 at a first end of the body 14, and a channel 16 through the body 14. The fastening member 40 includes an internal space 42 having internal threads 421, a hollow extension 44 extending out of a first end, a tunnel 46 through the extension 44 to communicate with the space 42, and an annular surface 45 on a first end of the space 42 adjacent to the extension 44. The sealing assembly 30 is urged against the annular surface 45. The joining member 10, the sealing assembly 30, and the fastening member 40 are sequentially put on a flexible sleeve 51 of a cable assembly 50. An oil tube 60 has a first end secured to the extension 44 as detailed later. The cable assembly 50 is disposed through the oil tube 60 from the first end of the oil tube 60. The external threads 141 are secured to the internal threads 421. The sealing assembly 30 is compressed by both the joining member 10 and the fastening member 40 so as to urge the sealing assembly 30 against the annular surface 45 for preventing lubricant from leaking. The flexible sleeve 51 includes an inner cable 53 through it. A gap exists between the inner cable 53 and the flexible sleeve 51. An opening 52 is provided at a first end of the flexible sleeve 51 so that lubricant can be filled into the gap between the inner cable 53 and the flexible sleeve 51 through the opening 52.

The sealing assembly 30 is made of integral rubber and includes a flexible ring 32 having an annular groove 321 on an end surface, and an O-ring 34 disposed in the annular groove 321 for leakage prevention purpose.

Figure 2:
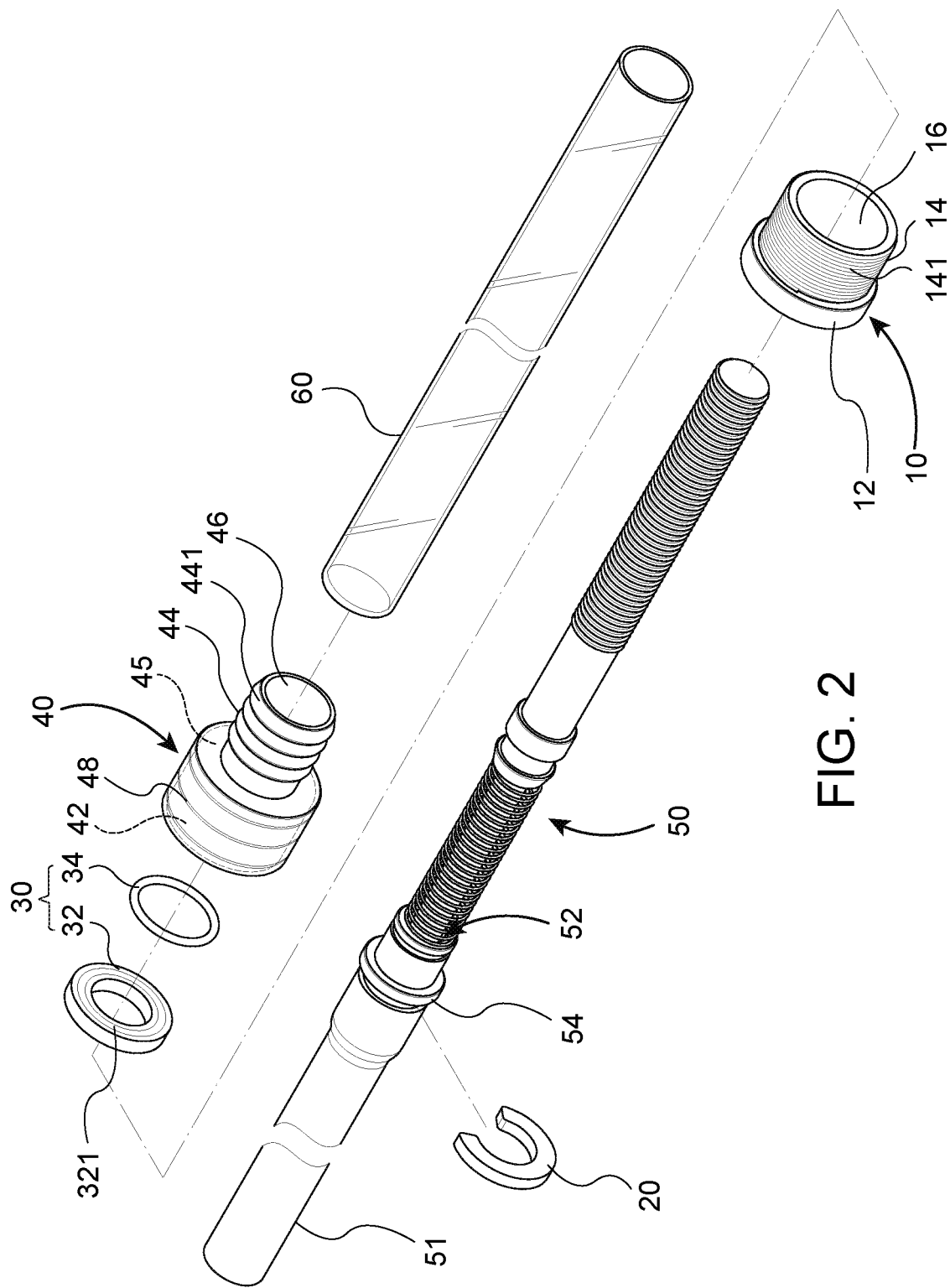
FIG. 2 is an exploded view of FIG. 1.

As shown in FIG. 2 specifically, the cable assembly 50 further comprises an annular flange 54 provided on an outer surface of the flexible sleeve 51. A C-clip 20 is provided at a second end of the body 14 and compressed by and between the body 14 and the annular flange 54. An inner diameter of the C-clip 20 is less than an outer diameter of the annular flange 54 and an outer diameter of the C-clip 20 is greater than a diameter of the channel 16. Thus, even the cable assembly 50 having a smaller outer diameter, with the provision of the C-clip 20, it is possible of securing the joining member 10, the sealing assembly 30, and the fastening member 40 onto the cable assembly 50.

As further shown in FIG. 2 specifically, a plurality of knurls 48 are formed on an outer surface of the fastening member 40 for aiding in gripping the fastening member 40.

As shown in FIGS. 2 and 3 specifically, the extension 44 includes a plurality of annular ridges 441 on an outer surface. The inclined ridges 441 taper from the space 42 to the extension 44. In assembly, the first end of the oil tube 60 is forcedly put on the tapered portions of the ridges 441 prior to being secured onto enlarged portion of the ridges 441. As a result, the oil tube 60 is secured to the extension 44.

As shown in FIGS. 2 and 3A specifically, after both the joining member 10 and the fastening member 40 have been fastened together, the C-clip 20 is compressed by and between the joining member 10 and the annular flange 54 and the sealing assembly 30 is used to seal a joining portion of the fastening member 40 and the annular flange 54. As shown in FIG. 3A, the flexible ring 32 urges against the annular surface 45 to prevent lubricant from leaving the space 42.

Figure 4:
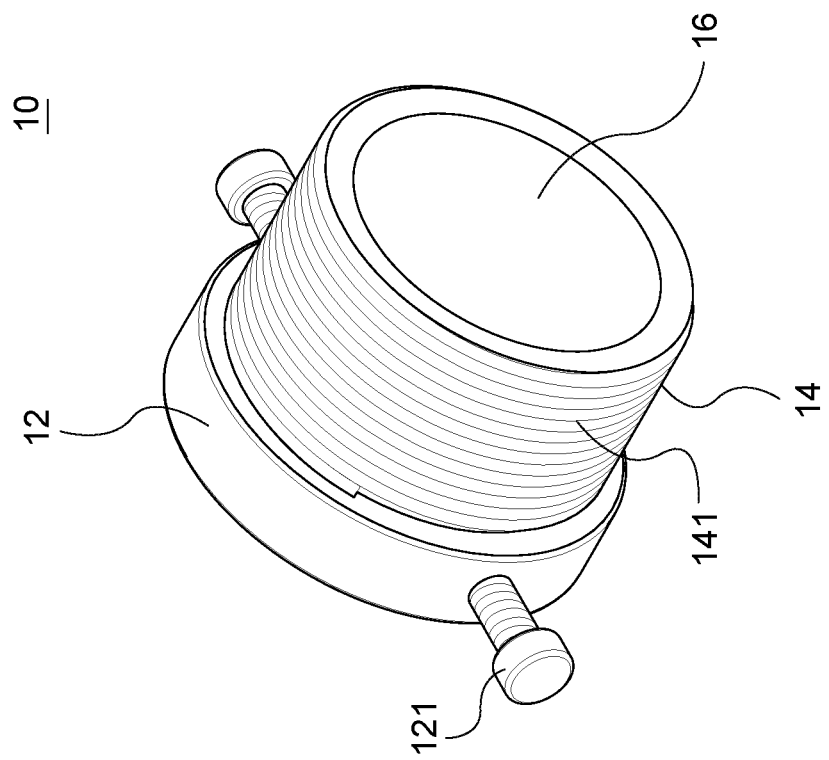
FIG. 4 is a perspective view of the joining member in another configuration.

Referring to FIG. 4, for aiding in applying force to the joining member 10 two opposite thumb screws 121 are provided on an outer surface of the rim 12. The thumb screws 121 are secured to the rim 12. In use, an individual may use the hand to push the thumb screws 121 so that the joining member 10 may be activated.

Figure 5:
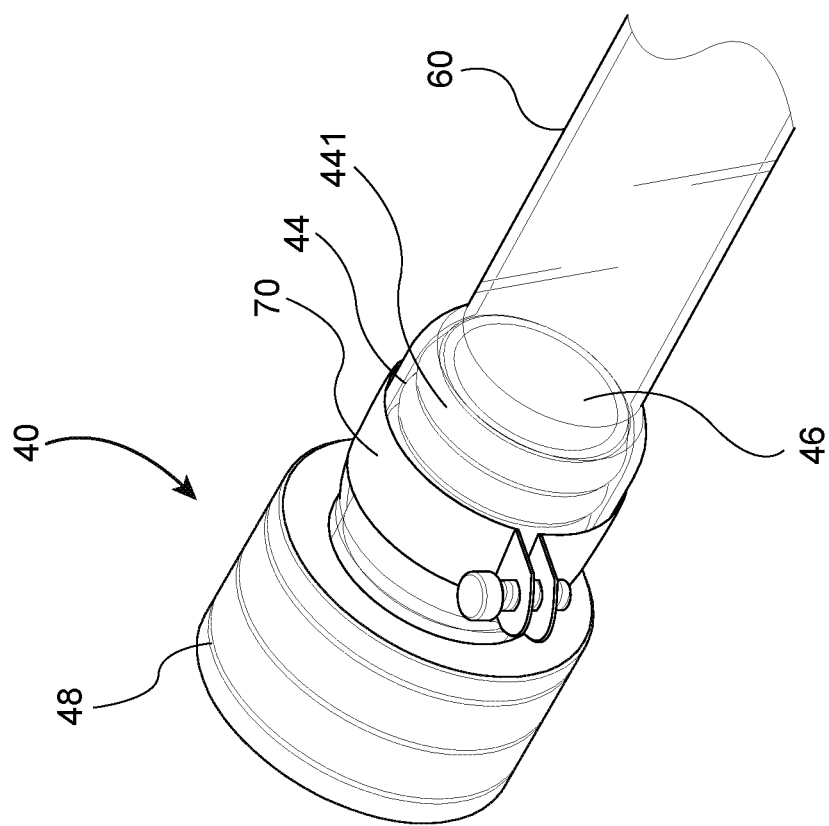
FIG. 5 is a perspective view showing a joining portion of the fastening member and the oil tube.

Referring to FIG. 5, for increasing a structural strength of the assembled oil tube 60 and the fastening member 40, a joining portion of the extension 44 and the oil tube 60 is provided with a spring metal clip 70 for further fastening the extension 44 and the oil tube 60.

Figure 7:
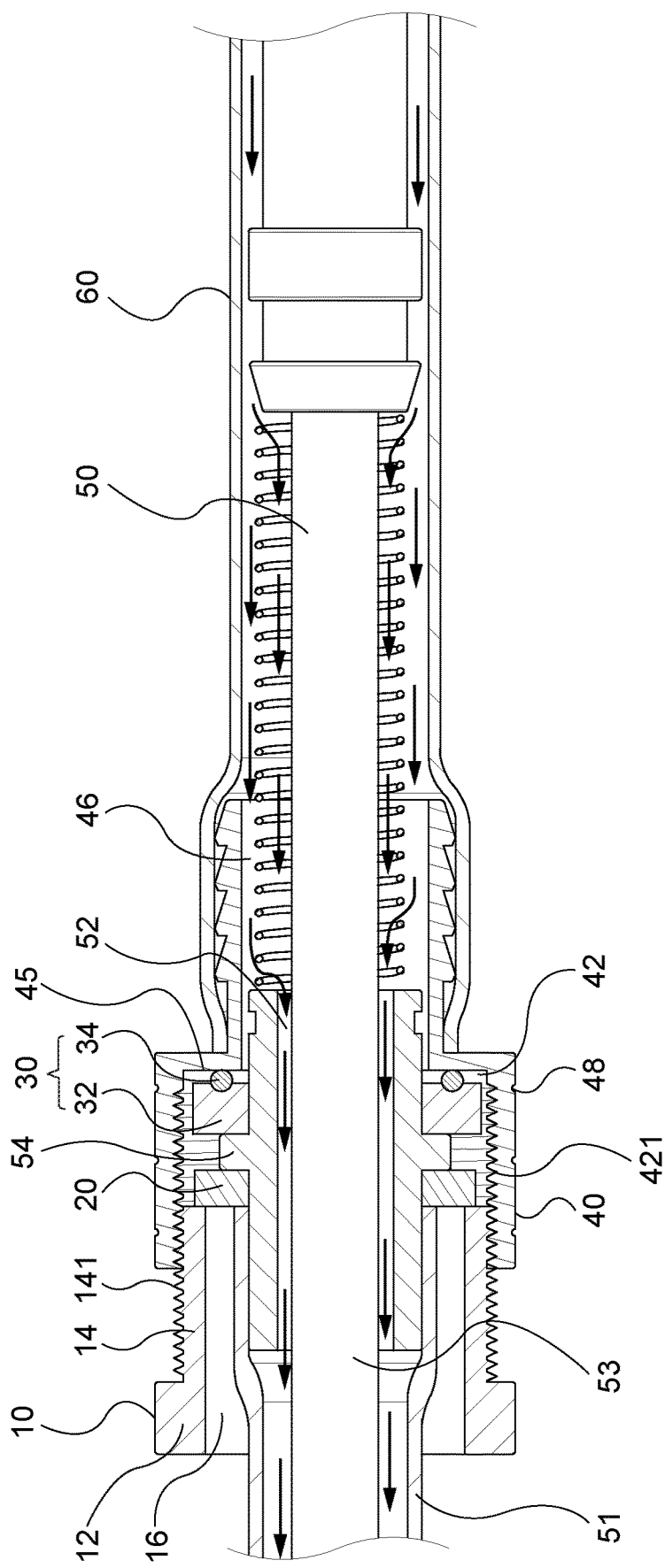
FIG. 7 is an enlarged view of the left portion of FIG. 3 showing a flow path of the lubricant through the brake cable.

Referring to FIGS. 6 and 7 in conjunction with FIG. 2, a manual oil pump 80 is provided at a second end of the oil tube 60 distal the fastening member 40 and in fluid communication therewith. The oil pump 80 is used to pump lubricant into the cable assembly 50 through the oil tube 60. Flow path of the lubricant is detailed below.

The lubricant, as indicated by arrows, flows from the oil tube 60 to the fastening member 40. The sealing assembly 30 urges against an end of the space 42 to prevent leakage through the space 42. After the lubricant has flowed through the opening 52, the lubricant further flows through the gap between an inner surface of the flexible sleeve 51 and the inner cable 53. The inner cable 53 can be quickly soaked by the lubricant as the pumping operation continues.

While the invention has been described in terms of preferred embodiments, those skilled in the art will recognize that the invention can be practiced with modifications within the spirit and scope of the appended claims.

What is claimed is:

1. A brake cable, comprising:
a joining member including a hollow body having external threads on an outer surface, an externally extended rim at a first end of the hollow body, and a channel through the hollow body;
a fastening member including an internal space having internal threads, a hollow extension extending out of a first end, a tunnel through the hollow extension to communicate with the internal space, and an annular surface on a first end of the internal space adjacent to the hollow extension;
a sealing assembly urged against the annular surface;
a cable assembly including a flexible sleeve with the joining member, the sealing assembly, and the fastening member are sequentially put thereon, an annular flange disposed on an outer surface of the flexible sleeve, and a C-clip disposed at a second end of the hollow body and compressed by and between the hollow body and the annular flange wherein an inner diameter of the C-clip is less than an outer diameter of the annular flange and an outer diameter of the C-clip is greater than a diameter of the channel; and
an oil tube having a first end secured to the hollow extension;
wherein the cable assembly is disposed through the oil tube from the first end of the oil tube;
wherein the external threads and the internal threads are secured together so that both the joining member and the fastening member are configured to compress the sealing assembly so as to urge the sealing assembly against the annular surface for preventing lubricant from leaking; and
wherein the flexible sleeve includes an inner cable passing through, a gap formed between the inner cable and an inner surface of the flexible sleeve, and an opening disposed at a first end of the flexible sleeve so that the lubricant is configured to fill into the gap between the inner cable and the flexible sleeve through the opening.

2. The brake cable of claim 1, further comprising at least one thumb screw disposed on an outer surface of the externally extended rim.

3. The brake cable of claim 1, further comprising a spring metal clip disposed at a joining portion of the hollow extension and the oil tube.

4. The brake cable of claim 1, wherein the hollow extension includes a plurality of annular ridges on an outer surface, the ridges being inclined and tapered from the internal space to the hollow extension.

5. The brake cable of claim 1, wherein the sealing assembly includes a flexible ring having an annular groove on an end surface, and an O-ring disposed in the annular groove.

6. The brake cable of claim 1, further comprising a plurality of knurls formed on an outer surface of the fastening member.

* * * * *